United States Patent [19]

Chen et al.

[11] Patent Number: 5,673,387
[45] Date of Patent: Sep. 30, 1997

[54] SYSTEM AND METHOD FOR SELECTING TEST UNITS TO BE RE-RUN IN SOFTWARE REGRESSION TESTING

[75] Inventors: Yih-Farn Robin Chen, Bridgewater; David Samuel Rosenblum, Maplewood; Kiem-Phong Vo, Berkeley Heights, all of N.J.

[73] Assignee: Lucent Technologies Inc., Murray Hill, N.J.

[21] Appl. No.: 698,164

[22] Filed: Aug. 12, 1996

Related U.S. Application Data

[63] Continuation of Ser. No. 243,664, May 16, 1994, abandoned.

[51] Int. Cl.$^6$ .................. G06F 9/00; G06F 13/00
[52] U.S. Cl. .................. 395/183.14; 395/183.12; 395/183.13; 395/183.17; 395/619
[58] Field of Search .................. 395/183.13, 183.14, 395/619, 183.12, 183.17

[56] References Cited

U.S. PATENT DOCUMENTS

| | | | |
|---|---|---|---|
| 4,696,003 | 9/1987 | Kerr et al. | 371/19 |
| 4,802,165 | 1/1989 | Ream | 395/183.14 |
| 4,864,569 | 9/1989 | DeLucia et al. | 371/19 |
| 5,022,028 | 6/1991 | Edmonds et al. | 371/25.1 |
| 5,086,393 | 2/1992 | Kerr et al. | 364/551.01 |
| 5,119,377 | 6/1992 | Cobb et al. | 371/19 |
| 5,157,782 | 10/1992 | Tuttle et al. | 395/575 |
| 5,185,867 | 2/1993 | Ito | 395/375 |
| 5,218,605 | 6/1993 | Low et al. | 371/16.1 |
| 5,220,658 | 6/1993 | Kerr et al. | 395/500 |
| 5,233,611 | 8/1993 | Triantafyllos et al. | 395/183.22 |
| 5,280,626 | 1/1994 | Kondo et al. | 395/500 |
| 5,335,342 | 8/1994 | Pope et al. | 395/575 |
| 5,488,727 | 1/1996 | Agrawal et al. | 395/709 |
| 5,495,610 | 2/1996 | Shing et al. | 395/182.16 |
| 5,511,185 | 4/1996 | Weinbaum et al. | 395/183.14 |
| 5,548,718 | 8/1996 | Siegel et al. | 395/183.14 |
| 5,579,476 | 11/1996 | Cheng et al. | 395/183.08 |
| 5,598,333 | 1/1997 | Marsico, Jr. | 395/183.14 |
| 5,600,789 | 2/1997 | Parker et al. | 395/183.14 |

OTHER PUBLICATIONS

Agrawl, H., Horgan, J., Krauser, E., London, S., "Incremental Regression Testing," Proceedings of the 1993 IEEE Conference on Software Maintenance, Montreal, Canada, Sept. 27–30, 1993.

Austin, T., Breach, S., Gurindar, S., "Efficient Detection of All Pointer and Array Access Errors," Computer Sciences Department, Univ. of Wisconsin, Madison. pp. 1–29, Dec. 1993.

Bates, S., Horwitz, S., "Incremental Program Testing Using Program Dependence Graphs," Conference Record of the Twentieth Annual ACM SIGPLAN–SIGACT Symposium on Principles of Programming Languages, Charleston, SC., Jan. 10–13, 1993, pp. 384–396.

Benedusi, P., Cimitile, A., De Carlini, U., "Post–Maintenance Testing Based on Path Change Analysis," Proceedings of the Conference on Software Maintenance, Phoenix, Arizona, Oct. 24–27, 1988, pp. 352–361.

(List continued on next page.)

*Primary Examiner*—Thomas G. Black
*Assistant Examiner*—Jean R. Homere

[57] ABSTRACT

A system and method for selective regression testing of a software system that determines which test units of a test suite must be re-run after a modification to the software system. The entities which are covered by each test unit are identified. When the software system is modified the entities which were changed by the modification are identified. The test units which need to be re-run are determined by analyzing the change information and the coverage information to select those test units that cover changed entities.

43 Claims, 13 Drawing Sheets

OTHER PUBLICATIONS

Binkley, D., "Using Semantic Differencing to Reduce the Cost of Regression Testing," Proceedings of the Conference on Software Maintenance, Orlando, Florida, Nov. 9–12, 1992, pp. 41–50.

Chen, Y., Nishimoto, M., Ramamoorthy, C., "The C Information Abstraction System," IEEE Transactions on Software Engineering, Vol. 16, No. 3, Mar. 1990, pp. 325–334.

Chen, Y., "The C Program Database and Its Applications," Proceedings of Summer 1989 USENIX, Baltimore, Maryland, pp. 157–171.

Chen, Y., "C Program Database Tools: A Tutorial," 1st Pan Pacific Conference on Information Systems, Kaohsiung, Taiwan, Jun. 1993, pp. 1–12.

Estrin, G., Hopkins, D., Coggan, B., Crocker, S., "SNUPER Computer—a computer in instrumentation automaton" AFIPS Proceedings of the Spring Joint Computer Conference, Atlantic City, NJ, vol. 30, Apr. 18–20, 1967, pp. 645–656.

Fischer, K., Raji, F., Chruscicki, A., "A Methodology for Retesting Modified Software," Proceedings of the National Telecommunications Conference, New Orleans, Louisiana, Nov. 29–Dec. 3, 1981, pp. B6.3.1–B6.3.6.

Gupta, R., Harrold, M., Soffa, M., "An Approach to Regression Testing using Slicing," Proceedings of the Conference on Software Maintenance, Orlando, Florida, Nov. 9–12, 1992, pp. 299–308.

Hamming, R., *Coding and Information Theory*, Prentice–Hall, 1986, pp. 94–97.

Harrold, M., Gupta, R., Soffa, M., "A Methodology for Controlling the Size of a Test Suite," ACM Transactions on Software Engineering and Methodology, vol. 2, No. 3, Jul. 1993, pp. 270–285.

Harrold, M., Soffa, M., "An Incremental Approach to Unit Testing during Maintenance," Proceedings of the Conference on Software Maintenance, Phoenix, Arizona, Oct. 24–27, 1988, pp. 362–367.

Hartmann, J., Robson, D., "Techniques for Selective Revalidation," IEEE Software, Jan. 1990, pp. 31–36.

Hastings, R., Joyce, B., "Purify: Fast Detection of Memory Leaks and Access Errors," Proceedings of the USENIX Winter 1992 Technical Conference, San Francisco, California, Jan. 20–24, 1992, pp. 125–136.

Ostrand, T., Weyuker, E., "Using Data Flow Analysis for Regression Testing," Sixth Annual Pacific Northwest Software Quality Conference, Portland, Oregon, Sept. 19–20, 1988, pp. 1–14.

Rosenblum, D., "Towards a Method of Programming with Assertions," Proceedings of the 14th International Conference on Software Engineering, Melbourne, Australia, May 11–15, 1992, pp. 92–104.

Rothermel, G., Harrold, M., "A Safe, Efficient Algorithm for Regression Test Selection," Proceedings of the Conference on Softward Maintenance, Sep., 1993.

Taha, A., Thebaut, S., Liu, S., "An Approach to Software Fault Localization and Revalidation Based on Incremental Data Flow Analysis," Proceedings of the 13th Annual International Computer Software & Applications Conference, Orlando, Florida, Sep. 20–22, 1989, pp. 527–534.

Yau, S., Kishimoto, Z., "A Method for Revalidating Modified Programs in the Maintenance Phase," Proceedings of the 11th Annual International Computer Software & Applications Conference, Tokyo, Japan, Oct. 7–9, 1987, pp. 272–277.

White, L. J., Narayanswamy, V., Friedman, T., Kirschenbaum, M., Piwowarski, P., Oha, M., "Test Manager: A Regression Testing Tool," Conference on Software Maintenance 1993, Proceedings, Montreal, Canada, Sep. 27–30, 1993, pp. 338–347.

Ostrand, T. J., Weyuker, E. J., "Using Data Flow Analysis for Regression Testing," Sixth Annual Pacific Northwest Software Quality Conference, Portland, Oregon, Sep. 19–20, 1988, pp. 233–247.

DeLucia, R. R., Wolf, D.J., Pike, T. A., Rockot, D. W., Musicante, N.J., "Software Verification and Validation System," European Patent Application 0–323 707, filed Nov. 25, 1988 on behalf of Westinghouse Electric Corporation of Pittsburgh, Pennsylvania, Application No. 88311218.7, Jul. 12, 1989.

Chen, Y–F, Nishimoto, M. Y., Ramamoorthy, C. V., "The C Information Abstraction System," IEEE Transactions on Software Engineering, vol. 16, No. 3, New York, Mar. 1, 1990, pp. 325–334.

Hartman, J, Robson, D. J., "Techniques for Selective Revalidation," IEEE Software, vol. 7, No. 1, Los Alamitos, California, Jan. 1990, pp. 31–36.

SYSTEM AND METHOD FOR SELECTING TEST UNITS TO BE RE-RUN IN SOFTWARE REGRESSION TESTING

This is a Continuation of application Ser. No. 08/243,664 filed May 16, 1994, now abandoned.

FIELD OF THE INVENTION

This invention relates generally to the testing of computer software systems. More particularly, the present invention relates to a system and method for selective regression testing that identifies which subset of a test suite must be run in order to test a new version of a software system.

BACKGROUND OF THE INVENTION

As computer software systems mature, maintenance activities become dominant. Studies have found that more than 50% of development effort in the life cycle of a software system is spent in maintenance, and of that, a large percentage is due to testing. Except for the rare event of a major rewrite, changes to a system in the maintenance phase are usually small and are made to correct problems or incrementally enhance functionality. Therefore, techniques for selective software retesting can help to reduce development time.

A test suite, which is used to test a software system, typically consists of many test units, each of which exercises or covers some subset of the entities of the system under test. A test unit must be re-run if and only if any of the program entities it covers has changed. However, it is difficult to identify the dependency between a test unit and the program entities that it covers. Computing such dependency information requires sophisticated analyses of both the source code and the execution behavior of the test units.

A number of selective retesting techniques have been previously described in the literature. Many of the early techniques were designed to work in tandem with a particular strategy for generating tests and ensuring test adequacy. One such example is Yau, Stephen S. and Kishimoto, Zenichi, *A Method for Revalidating Modified Programs in the Maintenance Phase*, in Proceedings of the 11th Annual International Computer Software and Applications Conference (COMPSAC), pages 272–277, IEEE Computer Society, Oct. 7–9, 1987, which describes a selective retesting technique for partition testing. Selective retesting techniques for data flow testing are described in Ostrand, Thomas J. and Weyuker, Elaine J., *Using Data Flow Analysis for Regression Testing*, in Proceedings of the Sixth Annual Pacific Northwest Software Quality Conference, Sep. 19–20, 1988; Harrold, Mary Jean, Gupta, Rajiv, and Soffa, Mary Lou, A Methodology for *Controlling the Size of a Test Suite*, ACM Transactions on Software Engineering and Methodology, Vol. 2, No. 3, July 1993, pages 270–285; and Harrold, Mary Jean and Soffa, Mary Lou, *An Incremental Approach to Unit Testing During Maintenance*, in Proceedings of the Conference on Software Maintenance 1988, pages 362–367, IEEE Computer Society, Oct. 24–27, 1988. In these approaches, a test data adequacy criterion (e.g., statement coverage, def-use coverage) is used to determine the adequacy of the test suite. The criterion gives rise to a number of test requirements (e.g., coverage of a particular execution path), and each test unit satisfies some subset of the test requirements. For selective regression testing, the system and its test units are analyzed to determine which test requirements each test unit satisfies and which requirements are affected by a modification. While such techniques can be adapted to other kinds of test generation strategies such as mutation testing, such adaptation would require that the methods and tools that support the techniques be customized to the chosen strategy in each instance. Other techniques have been described that use data flow analysis independently of the chosen test generation strategy. See, for example, Fischer, Kurt, Raji, Farzad and Chruscicki, Andrew, *A Methodology for Retesting Modified Software*, in Proceedings of the National Telecommunications Conference, Volume 1, pages B6.3.1–B6.3.6, IEEE, Nov. 29–Dec. 3, 1981; Benedusi, P., Cimitile, A. and De Carlini, U., *Post-Maintenance Testing Based on Path Change Analysis*, in Proceedings of the Conference on Software Maintenance 1988, pages 352–361, IEEE Computer Society, Oct. 24–27, 1988; and Hartmann, Jean and Robson, David J., *Techniques for Selective Revalidation*, IEEE Software, 7(1):31–36, January 1990. All of these data flow-based techniques employ intraprocedural data flow analysis, which limits their usefulness to unit-level testing. Furthermore, it is conceivable that the computational complexity of data flow analysis could make data flow-based selective retesting more costly than the naive retest-all approach, especially for testing large software systems. Others have tried to avoid the costs of data flow analysis by employing slicing techniques instead. See, for example, Binkley, David, *Using Semantic Differencing to Reduce the Cost of Regression Testing*, in Proceedings of the Conference on Software Maintenance 1992, pages 41–50, IEEE Computer Society, Nov. 9–12, 1992; and Gupta, Rajiv, Harrold, Mary Jean and Soffa, Mary Lou, *An Approach to Regression Testing Using Slicing*, in Proceedings of the Conference on Software Maintenance 1992, pages 299–308, IEEE Computer Society, Nov. 9–12, 1992. The slicing technique described by Gupta et al., for example, is used in conjunction with data flow testing to identify definition-use pairs that are affected by program edits, without requiring the computation and maintenance of data flow histories of the program and its test units.

SUMMARY OF THE INVENTION

The present invention differs from previous approaches in a number of significant ways. For example, it can be used with any chosen test generation and test suite maintenance strategy. Further, the analysis employed is performed at a granularity that makes it suitable for both unit-level and system-level testing. Additionally, the analysis algorithms employed are computationally inexpensive and thus scale up for retesting large systems with large numbers of test units.

In accordance with the present invention, a software system is partitioned into basic code entities which can be computed from the source code and which can be monitored during program execution. Each test unit of the software system is executed and the execution is monitored to analyze the test unit's relationship with the software system and to determine the subset of the code entities which are covered by the test unit. When the software system is changed, the set of changed entities are identified. This set of changed entities is then compared against each set of covered entities for the test units. If one of the covered entities of a test unit has been identified as changed, then that test unit must be re-run. A user may generate a list of changed entities to determine which test units must be re-run in the case of a hypothetical system modification. The invention may also be used to determine which entities of the software system are covered by the test units.

These and other advantages of the invention will be apparent to those of ordinary skill in the art by reference to the following detailed description and the accompanying drawings.

DETAILED DESCRIPTION

Figure 1:
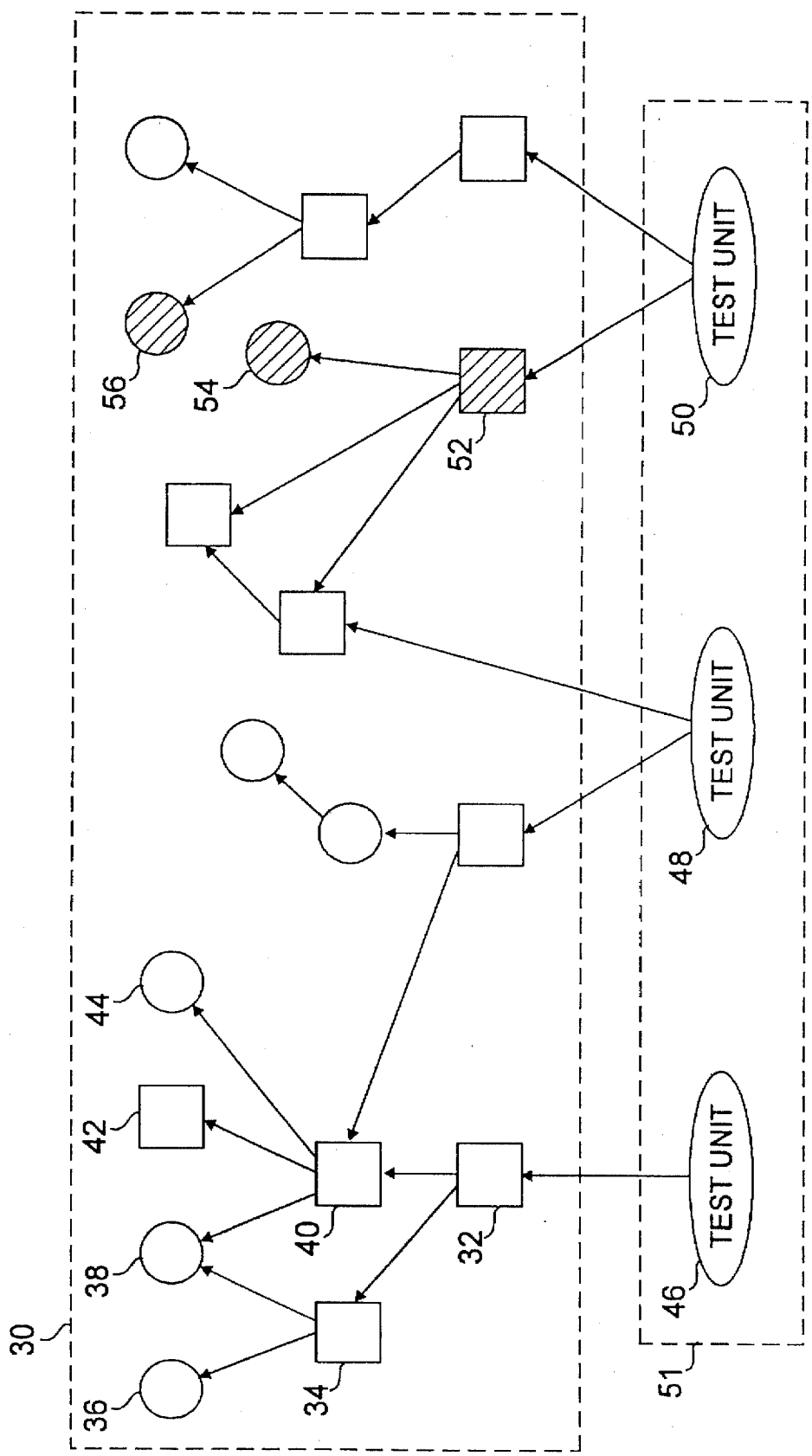
FIG. 1 shows a dependency relationship graph of a software system and its test suite.

A software system S may be considered as being made up of two sets of entities: functions F and nonfunctions V. Functions are the basic entities that execute program semantics by creating and storing values. It is assumed that every action of a program must be carried out in some function. Nonfunctions are nonexecuting entities in a program such as variables, types and macros. For example, variables define storage areas that functions manipulate, and types, among other things, define the storage extent of variables. A program in the software system is defined as a composition of some subsets of functions F and nonfunctions V. A test unit T for the system S is defined as a program and some fixed set of input data. The set of functions covered by the test unit T (i.e., invoked during execution of T) is called $T_f$. The set of nonfunction entities that are used by the functions in the set $T_f$ is called $T_v$.

The present invention relies on the premise that all memory manipulation in a program can be inferred from static source code analysis of the relationships among the functional and nonfunctional entities. This premise assumes two conditions. First, the existence of well-defined memory, i.e., that each accessed memory segment is identifiable through a symbolically defined variable. Second, the existence of well-bounded pointers, i.e., that a pointer variable or pointer expression must refer to some base variable and be bounded by the extent of the memory segment defined by that variable. The above mentioned premise, that all memory manipulation in a program can be inferred from static source code analysis of the relationships among the functional and non-functional entities, is therefore valid for computer languages which satisfy the above conditions.

For applications written in languages such as C, the well-defined memory condition is reasonable. Although C allows type coercion to convert an integer value to an address value, such constructs are seldom needed, except for programs which require direct manipulation of hardware addresses such as device drivers. However, in such cases where these constructs are needed, the addresses represented by such integer values are usually well separated from the address space occupied by normal variables. Thus, values of variables which are changed without mentioning the variable name rarely present a problem.

However, the well-bounded pointer condition sometimes fails in real C programs due to memory-overwrite and stray-pointer faults. These faults are among the hardest to detect, isolate and remove. A number of research techniques and commercial tools are available to help detect these faults. See, for example, Austin, Todd M., Breach, Scott E., and Sohi, Gurindar S., *Efficient Detection of All Pointer and Array Access Errors*, Technical Report TR 1197, Computer Sciences Department, University of Wisconsin-Madison, Dec. 1, 1993; and Hastings, Reed, and Joyce, Bob, *Purify: Fast Detection of Memory Leaks and Access Errors*, Proceedings of the USENIX Winter 1992 Technical Conference, pages 125–136, USENIX Association, Jan. 20–24, 1992. Whenever such a fault is detected during testing, an attempt must be made to identify the entities that are affected by the fault. For example, memory overwrites are often confined to the functions that cause them. If the affected entities can be identified, then these entities must be identified as changed entities for testing. In extreme cases where the effects of such faults are too difficult to determine, it must be assumed that all parts of memory are potentially damaged, and hence all test units must be re-run in order to ensure thorough testing of any code that exercises the fault. It is important to remove such faults so that they do not propagate from version to version.

Thus, given the above mentioned constraints, the proposition of selective regression testing on a software system S can be summarized as follows. Suppose T is a test unit for a software system S. When changes are made to S, if no elements in $T_f$ and $T_v$ are changed, then T does not need to be re-run on S. This proposition is further illustrated by FIG. 1.

FIG. 1 shows a dependency relationship graph and illustrates the selective retesting of a new version of a software system. Consider a software system S 30 which is made up of various entities. The functions F are represented by squares and the nonfunction entities V are represented by circles. The arrows represent the dependency relationships between the entities in the system 30, with the entity at the tail of an arrow depending on the entity at the head of the arrow. Thus, in FIG. 1, function 32 depends on function 34, and function 34 depends on variables 36 and 38. Function 32 depends on function 40, function 40 depends on variables 38 and 44, and function 40 depends on function 42. FIG. 1 also shows test units 46, 48, and 50 which are used to test the software system 30. The collection of test units 46, 48, and 50 which are used to test the software system 30 S are collectively referred to as a test suite 51.

Suppose that after the software system 30 was tested with the test suite 51, function 52 and nonfunction entities 54 and 56 were modified to create a new version of the software system 30. This modification is represented in FIG. 1 by the hatching of the modified entities 52, 54 and 56. Without selective regression testing, the entire test suite 51 must be re-run in order to adequately test the modified software system 30. However, by analyzing the relationships between the test units 46, 48, 50 and the entities they cover, it is possible to eliminate test units 46 and 48 from the regression testing of the new version. Only test unit 50 exercises function 52 and entities 54 and 56, and thus only test unit 50 needs to be re-run in order to test the modified software system 30.

The invention will be further described with reference to the example C code shown below. It is to be understood that reference to the C programming language is for example purposes only, and the present invention can be applied to selective regression testing of a software system written in any programming language which satisfies the well-defined memory and well-bounded pointer conditions discussed above. It is also to be understood that there are many ways to test C programs and to construct test units for C programs, including but not limited to test units that are C program code (such as the example below) and test units that are sets of input data values.

Consider the following C code, consisting of a software system defined in file s.c (lines 1–17), and a test unit defined in file t.c (lines 18–22). Line numbers are not part of the program but are used for ease of reference.

```
file s.c:
1: typedef int t₁, t₂;
2: t₁ v₁, v₃;
3: t₂ v₂, v₄;
4: f₁( )
5: {
6:      v₁ = 1;
7: }
8: f₂( )
9: {
10:     if (v₂ == 0)
11:         v₂ = 1;
12:     else v₄ = f₃( );
13: }
14: f₃( )
15: {
16:     return (v₃ == v₂);
17: }
file t.c:
18: main( )
19: {
20:     f₁( );
21:     f₂( );
22: }
```

Figure 2:
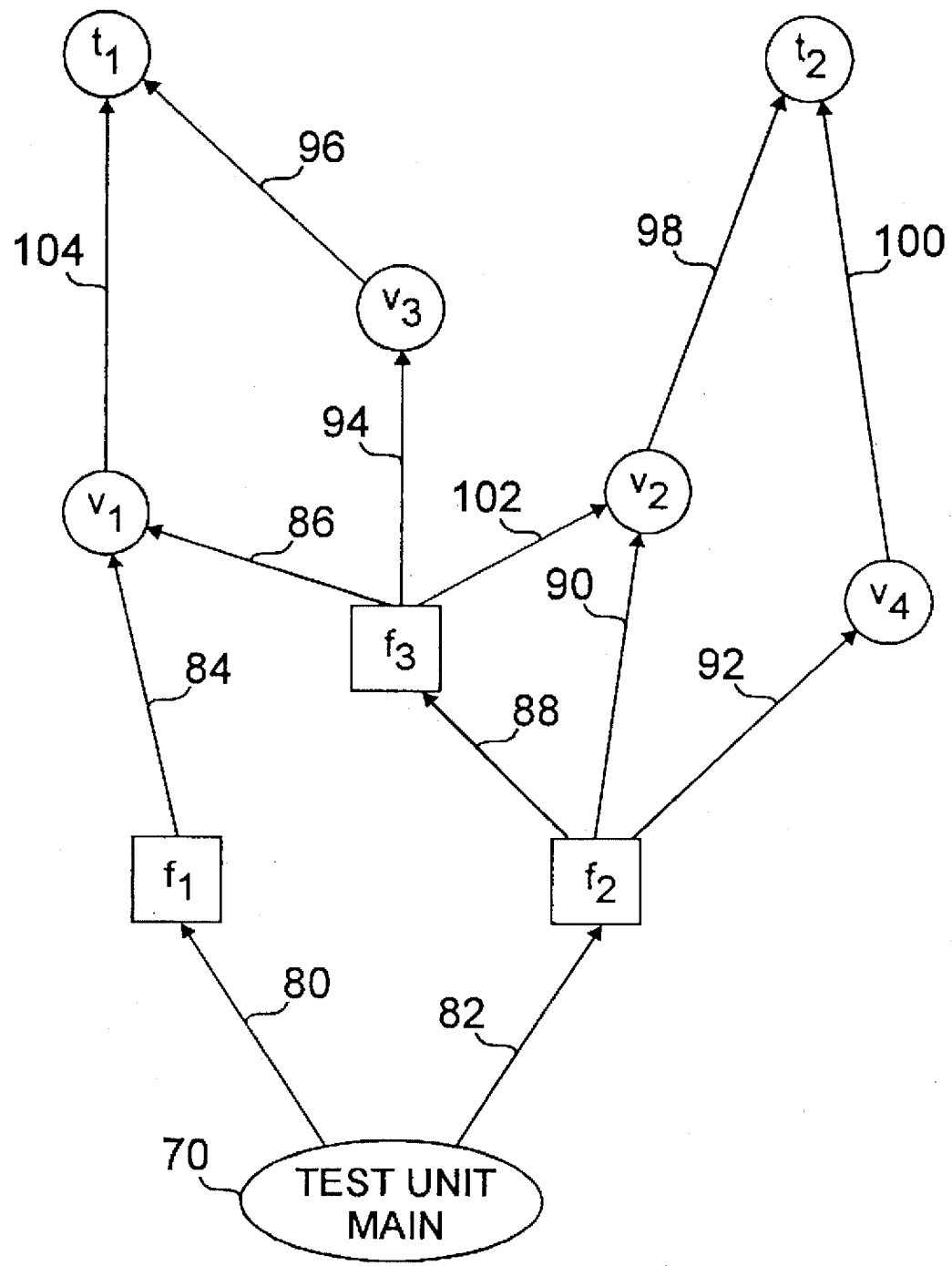
FIG. 2 shows a dependency relationship graph of a software system and one of its test units.

In this C program, $t_1$ and $t_2$ are type entities; $v_1$, $v_2$, $v_3$ and $v_4$ are variable entities; and $f_1$, $f_2$ and $f_3$ are function entities. The main function (program lines 18–22) in file t.c is considered the test unit for this example. The dependency relationships between the entities of this exemplary C program are shown in FIG. 2. As in FIG. 1, functions are represented by squares and nonfunction entities are represented by circles, and the arrows represent the dependency relationships between the entities in the exemplary C program, with the entity at the tail of an arrow depending on the entity at the head of the arrow.

Referring to FIG. 2, arrow 80 from test unit main 70 to $f_1$ represents that the test unit 70 depends on function $f_1$. This relationship arises from line 20 of the exemplary program in which the function main calls function $f_1$. Arrow 84 from $f_1$ to $v_1$ represents that function $f_1$ depends on variable $v_1$, which relationship arises from program line 6 in which variable $v_1$ is set to one within function $f_1$. Arrow 82 from the test unit 70 to $f_2$ represents that the test unit 70 depends on function $f_2$, which relationship arises from line 21 of the exemplary program in which the function main calls function $f_2$. Arrow 90 from $f_2$ to $v_2$ represents that function $f_2$ depends on variable $v_2$, which relationship arises from lines 10 and 11 of the exemplary program in which variable $v_2$ is evaluated, and if it is zero, then it is set to the value one, within function $f_2$. The arrow 98 from $v_2$ to $t_2$ represents that variable $v_2$ depends on type $t_2$, which relationship arises from line 3 of the exemplary program in which variable $v_2$ is set to type $t_2$. Arrow 92 from $f_2$ to $v_4$ represents that function $f_2$ depends on variable $v_4$, which relationship arises from line 12 of the exemplary program in which variable $v_4$ is set to the value returned from function $f_3$ if variable $v_2$ is not equal to zero, within function $f_2$. The arrow 100 from $v_4$ to $t_2$ represents that variable $v_4$ depends on type $t_2$, which relationship arises from line 3 of the exemplary program in which variable $v_4$ is set to type $t_2$. Arrow 94 from $f_3$ to $v_3$ represents that function $f_3$ depends on variable $v_3$, which relationship arises from line 16 of the exemplary program in which variable $v_3$ is set to the value of variable $v_2$ and where that value is returned, within function $f_3$. The arrow 96 from $v_3$ to $t_1$ represents that variable $v_3$ depends on type $t_1$, which relationship arises from line 2 of the exemplary program in which variable $v_3$ is set to type $t_1$. Arrow 102 from $f_3$ to $v_2$ represents that function $f_3$ depends on variable $v_2$, which relationship arises from line 16 of the exemplary program in which variable $v_3$ is set to the value of variable $v_2$ and where that value is returned, within function $f_3$. The arrow 104 from $v_1$ to $t_1$ represents that variable $v_1$ depends on type $t_1$, which relationship arises from line 2 of the exemplary program in which variable $v_1$ is set to type $t_1$. The exemplary C program and its dependency relationship graph shown in FIG. 2 will be referred to further below in describing the functioning of the invention.

Figure 3:
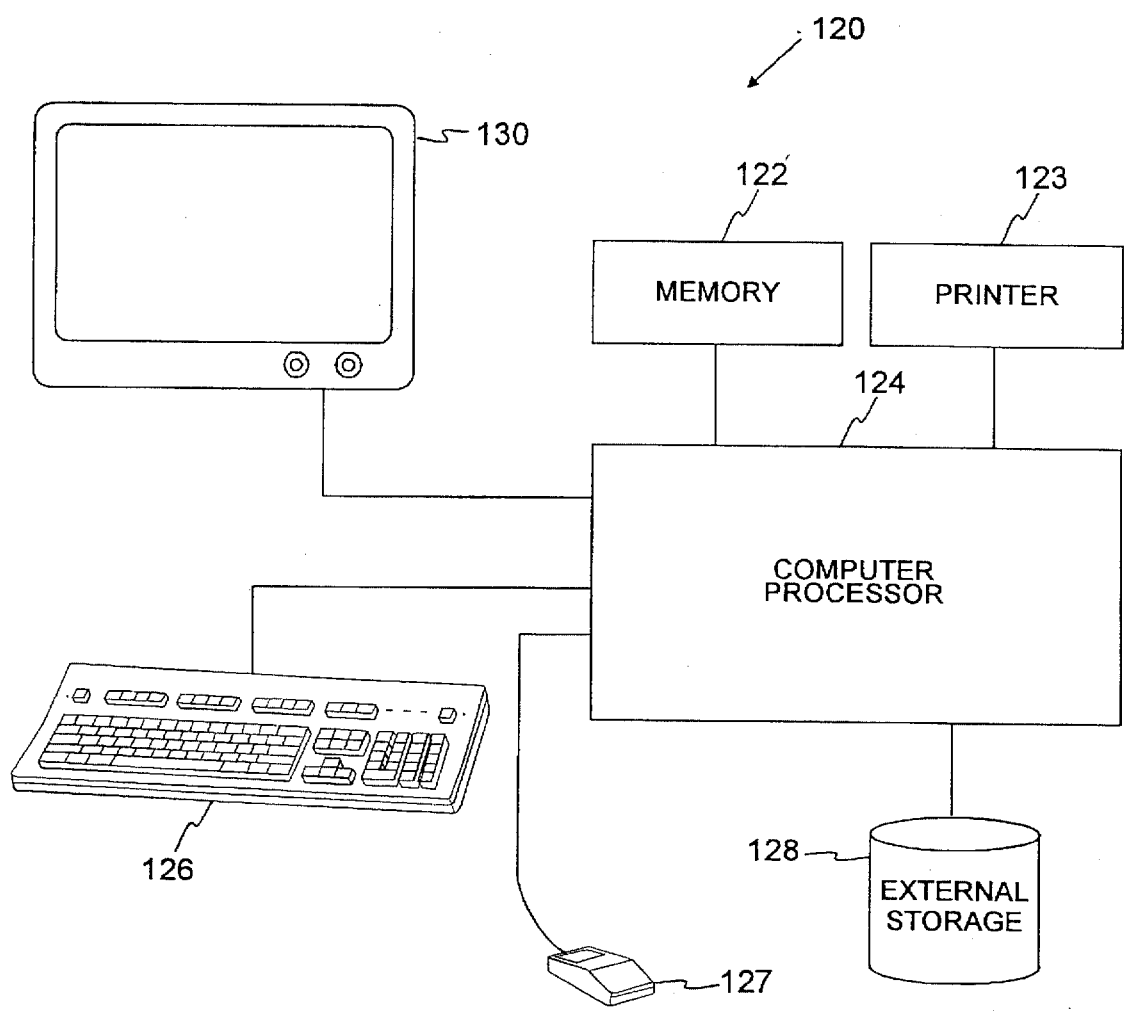
FIG. 3 shows a schematic of the components of a computer system which can be used in accordance with the present invention.

The functions of the present invention may be performed by a programmed computer as shown in FIG. 3. FIG. 3 shows a computer system 120 which comprises output devices such as a computer display monitor 130 and a printer 123, a textual input device such as a computer keyboard 126, a graphical input device such as a mouse 127, a computer processor 124, a memory unit 122, and an external storage device such as a disk drive 128. The computer processor 124 is connected to the display monitor 130, the printer 123, the memory unit 122, the external storage device 128, the keyboard 126, and the mouse 127. The external storage device 128 and the memory unit 122 may be used for the storage of data and computer program code. The functions of the present invention are performed by the computer processor 124 executing computer program code which is stored in the memory unit 122 or the external storage device 128. The computer system 120 may suitably be any one of the types which are well known in the art such as a mainframe computer, a minicomputer, a workstation, or a personal computer.

In one embodiment of the present invention, instrumented object code is executed by the computer processor 124 such that an execution trace is generated during program execution. This is discussed in more detail below in conjunction with FIG. 4. Instrumentation is a well known method by which computer software is enhanced with extra statements such that an execution trace is generated during program execution. See, for example, Estrin, G., Hopkins, D., Coggan, B. and Crocker, S. D., *SNUPER COMPUTER—a Computer in Instrumentation Automation*, Proceedings of the AFIPS Spring Joint Computer Conference Apr. 18–20, 1967, Volume 30, pages 645–656, which is incorporated by reference herein.

Figure 4:
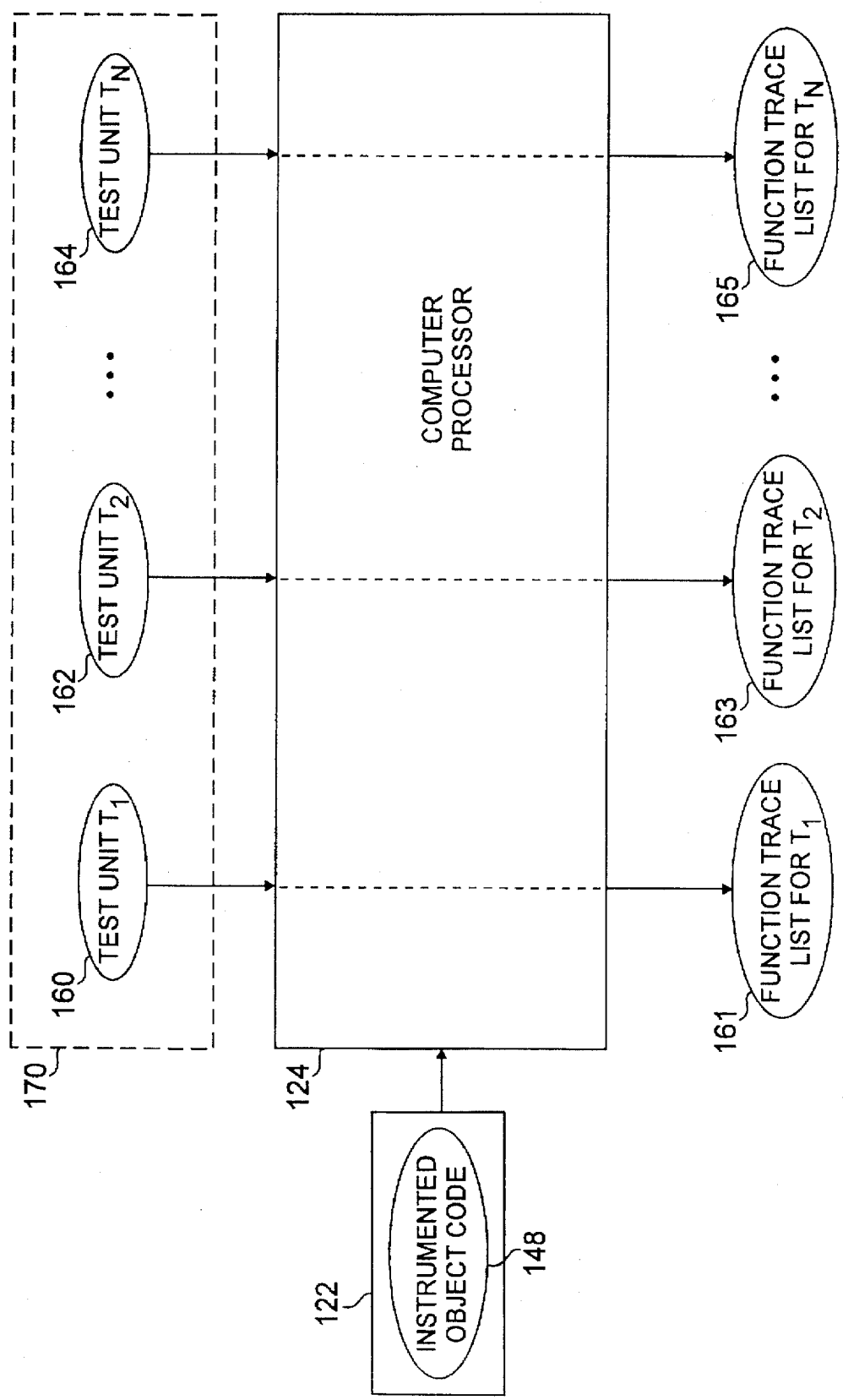
FIG. 4 is a block diagram illustrating the generation of function trace lists in accordance with the present invention.

One suitable method for the generation of instrumented object code 148 as shown in FIG. 4 is as follows. C source code is pre-processed by adding instrumentation to the code, which results in instrumented C source code. This instrumented C source code is then compiled by a C compiler, with the result being instrumented object code. The instrumented object code may be executed on the computer processor 124. One suitable pre-processor is the Annotation Pre-Processor ("APP") for C programs developed in UNIX-based environments. APP is described in Rosenblum, David S., *Towards a Method of Programming with Assertions*, in Proceedings of the 14th International Conference on Software Engineering, pages 92–104, Association for Computing Machinery, May 11–15, 1992, which is herein incorporated by reference. APP has the ability to instrument C source code in order to create a trace of execution events. Other well known methods for instrumenting C source code and for generating execution traces may also be used.

FIG. 4 shows the generation of function trace lists using instrumented object code. A function trace list is defined as the set $T_T$ of all functions covered by a test unit T, as described above. Assume a test suite 170 consisting of N test units. This test suite 170 comprises a first test unit $T_1$ 160, a second test unit $T_2$ 162, through an Nth test unit $T_N$ 164. The instrumented object code 148 is stored in the memory unit 122 and is executed N times by the computer processor 124, with one execution for each of the N test units 160 and 162 through 164. Each execution of the instrumented object code 148 by the computer processor 124 results in a function trace list for the corresponding test unit. Thus, when the instrumented object code 148 is executed using test unit $T_1$ 160, the execution generates a function trace list 161 for test unit $T_1$. When the instrumented object code 148 is executed using test unit $T_2$ 162, the execution generates a function trace list 163 for test unit $T_2$. When the instrumented object code 148 is executed using test unit $T_N$ 164, the execution generates a function trace list 165 for test unit $T_N$. These N function trace lists 161 and 163 through 165 are generated during actual execution of the instrumented object code 148.

The generation of and contents of the function trace lists are further illustrated with reference to the exemplary C program set forth above and illustrated in FIG. 2. Assume that instrumented object code of the software system shown in the exemplary C program is executed on a processor using the main function as the test unit. During the actual execution of the software, the expression ($v_2$==0) evaluated in line 10 is true, and therefore the else statement in line 12 is not executed. Thus, function $f_3$ is not executed and the function trace list for the test unit main in the example would consist of the set $T_T$={main, $f_1$, $f_2$}, because $f_1$ and $f_2$ are called by main in program lines 20 and 21. Thus, referring to FIG. 2, although there is a dependency relationship between function $f_2$ and function $f_3$ as shown by the arrow 88, this is a static relationship of the source code that may not be exercised by every execution of the program. The function trace lists are determined dynamically and contain the set $T_T$ of functions which are actually exercised by a test unit T during execution.

Figure 6:
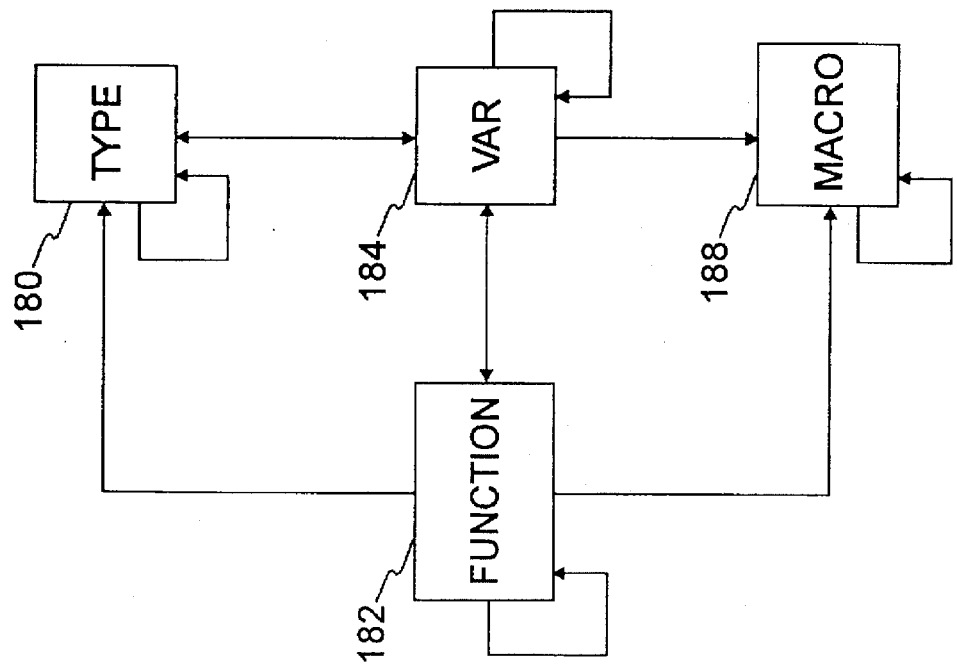
FIG. 6 is a conceptual model of the entity relationships represented in a C program database which may be used in conjunction with the present invention.
Figure 5:
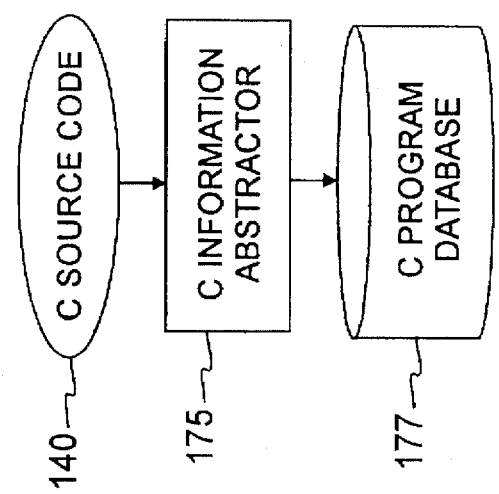
FIG. 5 is a flow diagram of a method for generating a C program database for use in accordance with the present invention.

FIG. 5 illustrates the process of generating a C program database 177 for a software system, such as the software system 30. C source code 140 is provided to a C information abstractor 175. The C information abstractor 175 generates the C program database 177. This C program database 177 contains the entities that comprise the system, dependency relationships among the entities, and attributes of the entities and relationships. FIG. 6 illustrates a conceptual model of the C program database 177 and shows the entities used by the present invention. Each box represents an entity kind, and each connection between two boxes represents a reference relationship. As discussed above, the present invention deals with four kinds of entities in a C program: types 180, functions 182, variables 184 and macros 188. In this conceptual model, a reference relationship exists between an entity A and an entity B if the definition of entity A refers to entity B. In other words, entity A refers to entity B if A cannot be compiled and executed without the definition of B. Table 1 shown below lists the reference relationships among the four entity kinds used by the present invention.

| Entity kind 1 | Entity kind 2 | definition |
| --- | --- | --- |
| function | function | function refers to function |
| function | type | function refers to type |
| function | variable | function refers to variable |
| function | macro | function refers to macro |
| type | variable | type refers to variable |
| type | macro | type refers to macro |
| type | type | type refers to type |
| variable | function | variable refers to function |
| variable | type | variable refers to type |
| variable | variable | variable refers to variable |
| variable | macro | variable refers to macro |
| macro | macro | macro refers to macro |

Each entity has a set of attributes which contain information about the entity. For example, the function $f_1$ of the exemplary C program would have the following attributes:

| | |
| --- | --- |
| file: | s.c |
| kind: | function |
| datatype: | int |
| name: | $f_1$ |
| static: | no |
| bline: | 9 |
| eline: | 12 |
| checksum: | 9EECCF7 (base 16 integer) |

The file attribute indicates the file in which the function is defined. The datatype attribute indicates the data type of the function. The name attribute indicates the name of the function. The static attribute indicates whether or not the function was defined with storage class "static". The bline attribute indicates the beginning line number of the function. The eline attribute indicates the ending line number of the function. The checksum attribute contains an integer value representing the source text of the function definition. This integer value is represented above by "9EECCF7", which is an example of a base 16 integer checksum value. The checksum value is computed using a hash coding technique. Any suitable hash coding technique may be used, such as the technique described in Hamming, Richard W., *Coding and Information Theory*, Prentice Hall, 1986, pp. 94–97, which is incorporated by reference herein. The checksum is used in the preferred embodiment of the present invention to determine whether an entity has been changed after a revision to the software system. This use of the checksum attribute will be discussed in more detail below in conjunction with FIG. 10 and in particular steps 272 through 276 of the flowchart shown in FIG. 10. There is a different set of attributes for each entity kind. The attributes shown above for function $f_1$ are the attributes for function entities. Each kind of entity has its own set of attributes, but all entities have the attributes kind, file, name and checksum, which are the four attributes used by the present invention.

A suitable C information abstractor 175 for use with the present invention may be the C information abstractor CIA which is described in Chen, Yih-Farn, *The C Program Database and Its Applications*, in Proceedings of the Summer 1989 USENIX Conference, pages 157–171, USENIX Association, June 1989, which is incorporated by reference herein. Further information on the C program database may be found in Chen, Yih-Farn, Nishimoto, Michael Y., and Ramamoorthy, C. V., *The C Information Abstraction System*, IEEE Transactions on Software Engineering, Vol. 16, No. 3, March 1990, pp. 325–334, which is incorporated by reference herein. Other suitable C information abstractors may be used to generate the C program database 177. Such suitable C information abstractors must generate a C program database 177 which contains entities, entity attributes and entity relationships as described above.

As discussed above, reference to the C program language is used herein to illustrate one embodiment of the present invention. The present invention may be applied to the selective regression testing of software systems written in other languages. These other languages may have different entities and different entity relationships than those discussed above with respect to the C language. However, selective regression testing of a software system written in a language other than C using the present invention could be readily implemented by one of ordinary skill in the art with reference to the above description of entities and entity relationships and this disclosure in general.

Figure 7:
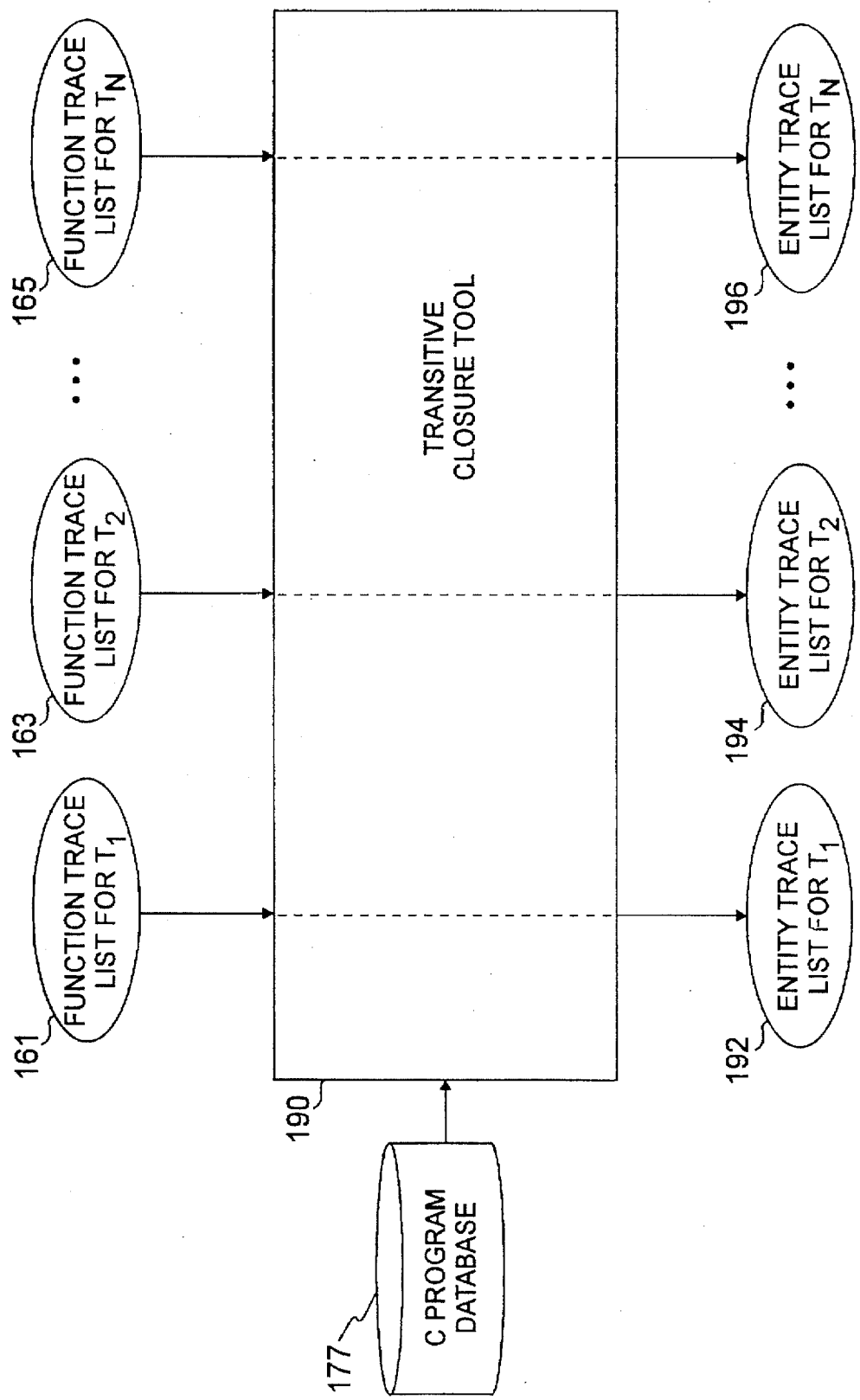
FIG. 7 is a block diagram of a transitive closure tool used to generate entity trace lists in accordance with the present invention.

The function trace lists and the C program database are then used to generate an entity trace list for each test unit. The entity trace list is a list of entities that are potentially covered by the test unit. Thus, for a test unit T, the entity trace list is the set of entities $T_f \cup T_v$. In other words, the entity trace list is a list of the entities reachable from the list of functions in the function trace list. FIG. 7 shows a block diagram representing the generation of entity trace lists using a transitive closure tool 190. For each function trace list 161 and 163 through 165 which was generated as described above in conjunction with FIG. 4, the transitive closure tool 190 uses the set of functions $T_f$ contained in the function trace list and expands it to include not only all the functions covered by the test unit, but also all entities $T_v$ that are reachable from those functions through dependency relationships. This is accomplished by using the dependency relationships which are defined in the C program database 177. Thus, the transitive closure tool 190 uses the function trace list 161 for test unit $T_1$ and the C program database 177 to generate the entity trace list 192 for test unit $T_1$. The transitive closure tool 190 uses the function trace list 163 for test unit $T_2$ and the C program database 177 to generate the entity trace list 194 for test unit $T_2$. The closure tool 190 uses the function trace list 165 for test unit $T_N$ and the C program database 177 to generate the entity trace list 196 for test unit $T_N$.

Figure 8:
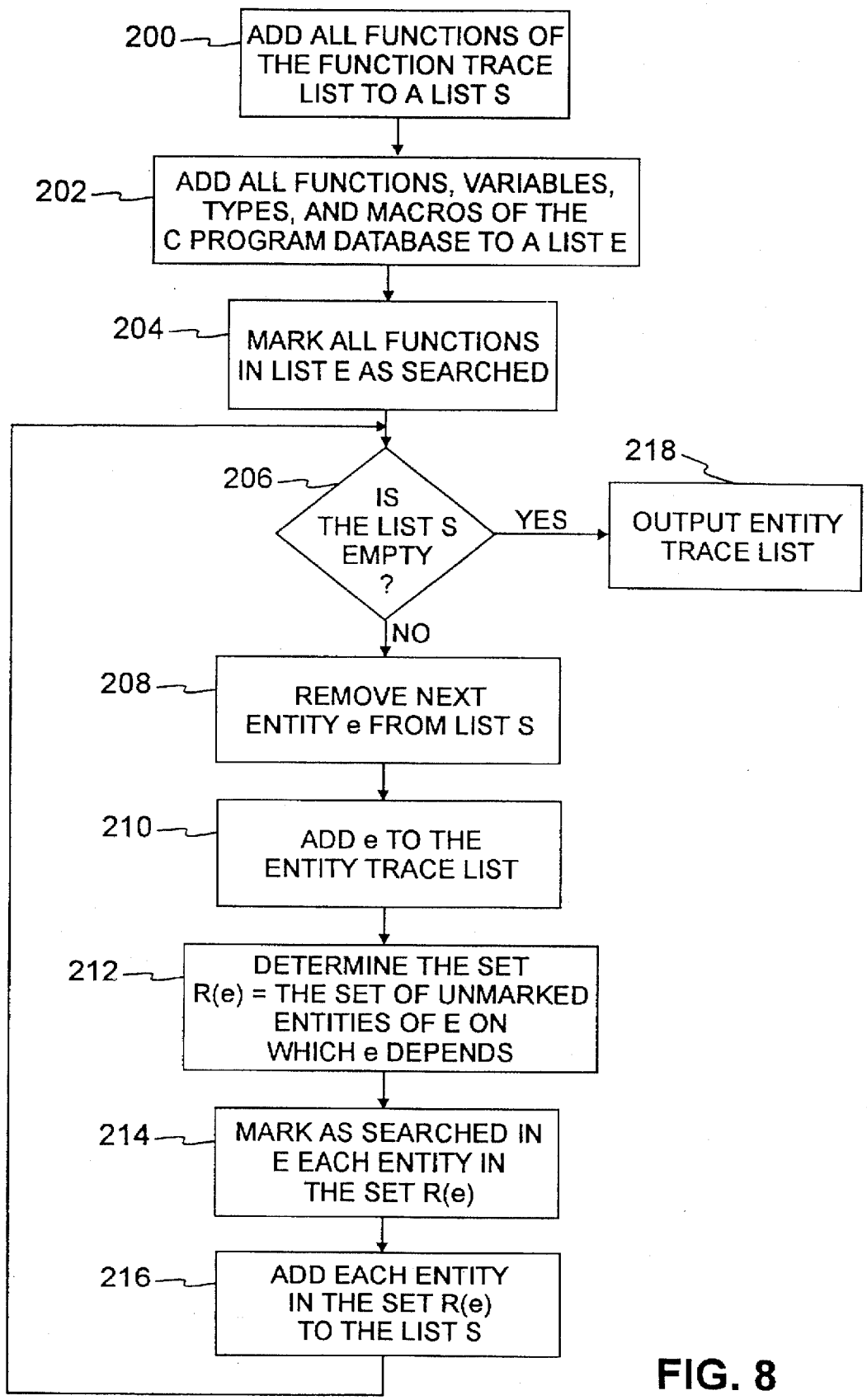
FIG. 8 is a flow diagram of the steps performed by the transitive closure tool in generating entity trace lists in accordance with the present invention.

The functioning of the transitive closure tool 190 is described in more detail in conjunction with the flow diagram of FIG. 8. For each function trace list 161 and 163 through 165, the following steps are performed in order to generate an entity trace list 192 and 194 through 196, respectively. In step 200 all functions of the function trace list are added to a list S. In step 202, all functions, variables, types and macros of the C program database 177 are added to a list E. In step 204, all functions in the list E are marked as searched. In step 206, it is determined if the list S is empty. If list S is not empty then the next entity e is removed from the list S in step 208. In step 210 the entity e is added to the entity trace list. In step 212 the set R(e) is determined. The set R(e) is defined as the set of unmarked entities in the list E on which entity e depends. This set is determined by reference to the C program database 177 which contains dependency relationship information for all entities in the C source code. In step 214 each entity in the set R(e) is marked as searched in the list E. In step 216, each entity in the set R(e) is added to the list S. Control is then passed to step 206. If it is determined in step 206 that the list S is empty, then the entity trace list is complete and it is output in step 218. Note that unlike the generation of a function trace list which is carried out during test unit execution, the generation of an entity trace list is carried out by statically analyzing the source code's dependency relationships, starting from the function trace list.

The entity trace list will now be explained in conjunction with the exemplary C program set forth above and illustrated in FIG. 2. As discussed above, the function trace list for the test unit main of the exemplary C program would consist of the set $T_f = \{main, f_1, f_2\}$. Based upon this function trace list, the entity trace list would be generated by the transitive closure tool 190 as the set of entities $T_f \cup T_v = \{main, f_1, f_2, v_1, v_2, v_4, t_1, t_2\}$. Referring to FIG. 2, it is seen that the entities in the entity trace list include functions main, $f_1$ and $f_2$ and those nonfunction entities on which functions main, $f_1$ and $f_2$ depend.

Note that as discussed above the generation of the function trace list is accomplished through dynamic analysis while the generation of the entity trace list is accomplished through static analysis of the dependency relationships that exist in the C source code 140 and that are contained in the C program database 177. Thus, as noted above in conjunction with the discussion of the generation of the function trace list for the exemplary C program, function $f_3$ is not included in the function trace list because line 12 of the exemplary C program is not executed and thus function $f_3$ is not covered by the test unit main. It follows that the variable $v_4$ is not evaluated during actual program execution. However, since there is a relationship between function $f_2$ and variable $v_4$ as shown by the arrow 92 in FIG. 2, variable $v_4$ would be included in the entity trace list for the test unit main.

Figure 9:
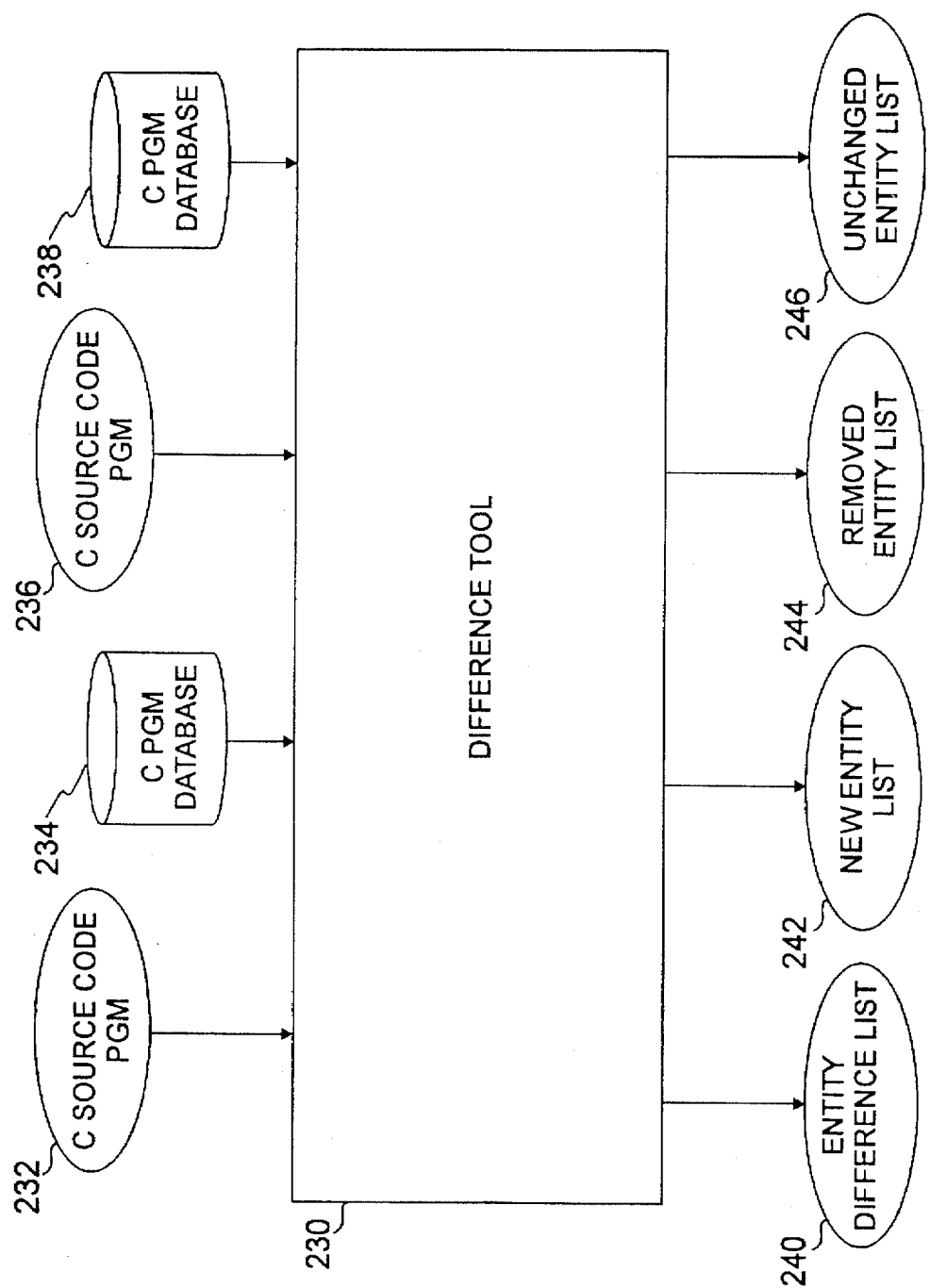
FIG. 9 is a block diagram of a difference tool which compares two software versions in accordance with the present invention.

FIG. 9 shows a block diagram illustrative of the functioning of a difference tool 230. After modification has been made to program source code, the difference tool 230 determines which entities have been changed. A first C source code program 232 represents a first version of program source code. A second C source code program 236 represents a second version of program source code after modifications have been made to the first C source code program 232. The difference tool 230 computes the difference between the two programs. Prior to using the difference tool 230, a C program database must be generated for the program source code for each of the two versions being compared. These C program databases are generated as discussed above in conjunction with FIGS. 5 and 6. Thus, the input to the difference tool 230 is a first C source code program 232 along with a first C program database 234 for the first C source code program 232, and a second C source code program 236 along with a second C program database 238 for the second C source code program 236. The difference tool 230 generates an entity difference list 240, a new entity list 242, a removed entity list 244 and an unchanged entity list 246. The entity difference list 240 is a list of all entities which have been changed by the revision from the first C source code program 232 to the second C source code program 236. An entity is considered to be changed if the source code text of the definition of the entity has changed, ignoring changes to spaces, tabs, line breaks and comments. The new entity list 242 is a list of entities which appear in the second C source code program 236 but not in the first C source code program 232. The removed entity list 244 is a list of entities which appear in the first C source code program 232 but not in the second C source code program 236. The unchanged entity list 246 is a list of entities which are unchanged between the first C source code program 232 and the second C source code program 236.

Figure 10:
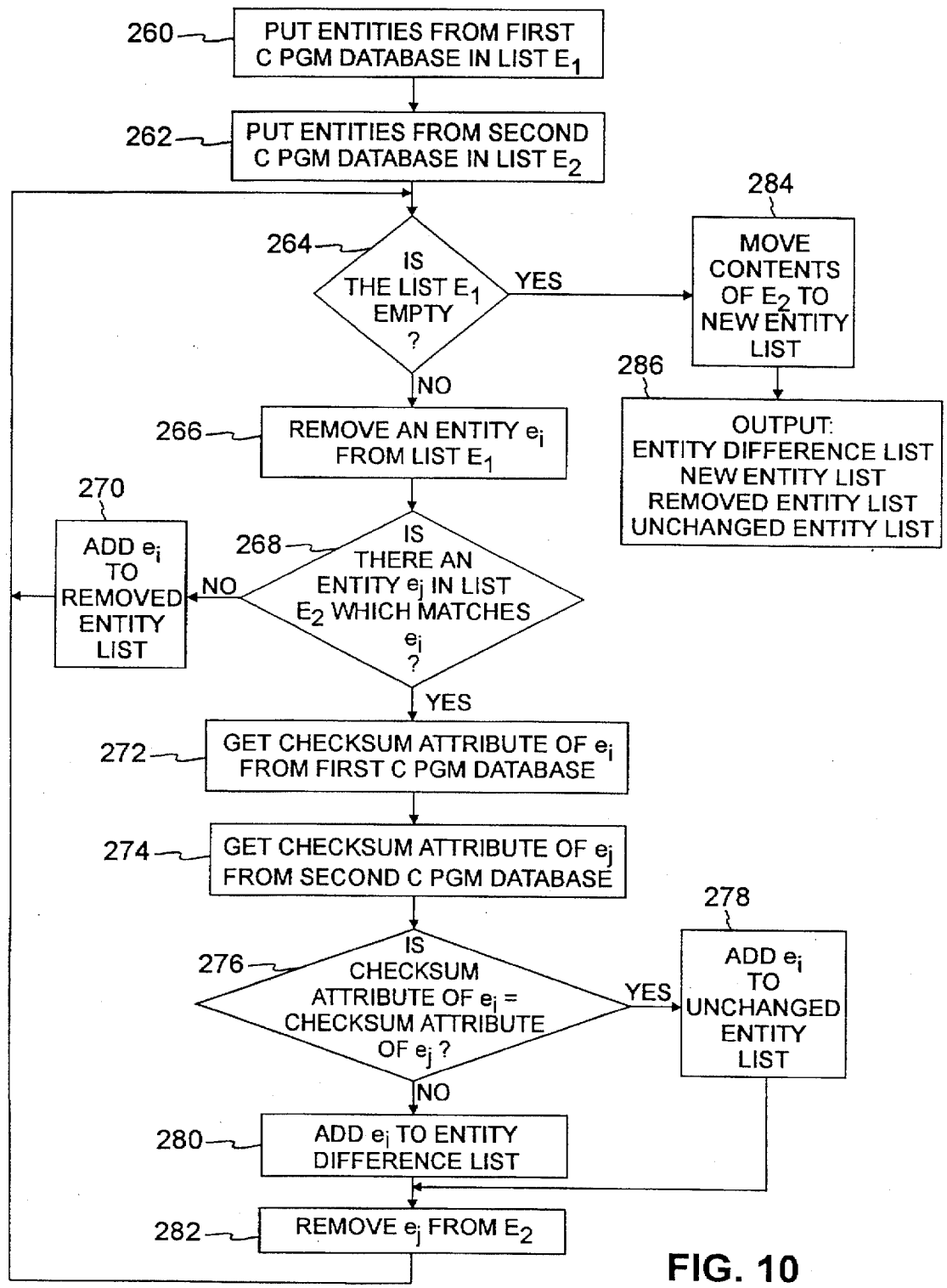
FIG. 10 is a flow diagram of the steps performed by the difference tool in comparing two software versions in accordance with the present invention.

The functioning of the difference tool 230 is described in more detail in conjunction with the flow diagram of FIG. 10. In step 260 the entities from the first C program database 234 are put into a list $E_1$. In step 262 the entities from the second C program database 238 are put into a list $E_2$. In step 264 it is determined whether list $E_1$ is empty. If list $E_1$ is not empty, then an entity $e_i$ is removed from the list $E_1$ in step 266. In step 268 it is determined whether there is an entity $e_j$ in list $E_2$ which matches $e_i$. Two entities match if they have the same name and entity kind. If there is not an entity $e_j$ in list $E_2$ which matches $e_i$, then entity $e_i$ is added to the removed entity list in step 270 and control returns to step 264. If there is an entity $e_j$ in list $E_2$ which matches $e_i$, then the checksum attribute of entity $e_i$ is retrieved from the first C program database 234 in step 272 and the checksum attribute of entity $e_j$ is retrieved from the second C program database 238 in step 274. In step 276 the checksum attribute of entity $e_i$ is compared to the checksum attribute of entity $e_j$. If the checksum attribute of entity $e_i$ is equal to the checksum attribute of entity $e_j$ then entity $e_i$ is added to the unchanged entity list in step 278. If the checksum attribute of entity $e_i$ is not equal to the checksum attribute of entity $e_j$, then entity $e_i$ is added to the entity difference list in step 280. In step 282 entity $e_j$ is removed from list $E_2$. Control is then passed back to step 264. If it is determined in step 264 that list $E_1$ is empty then the contents of list $E_2$ are moved to the new entity list in step 284. In step 286 the entity difference list 240, the new entity list 242, the removed entity list 244, and the unchanged entity list 246 are output.

Step 276 discussed above, in which the checksum attribute of $e_i$ is compared to the checksum attribute of $e_j$ results in an efficient comparison between the entities. As discussed above in conjunction with the description of entity attributes, the checksum is an integer value representing the source text of the entity definition. If the checksums of the two entities are equal, there is a high probability that the source code text of the two entities are identical, ignoring differences in spaces, tabs, line breaks and comments. Although there is a small possibility that a checksum comparison will result in an inaccurate comparison of the entities, we have found that the increase in efficiency using the checksum method outweighs the price of possible inaccuracy. Thus, comparing entities using the checksum attribute is the preferred method of comparison.

If greater accuracy is desired, the entities could be compared by getting the actual source text definition of entities $e_i$ and $e_j$ in steps 272 and 274 respectively, and by comparing the source text definitions in step 276.

One suitable difference tool for use with the present invention is Ciadiff, which is described in Chen, Yih-Farn, *C Program Database Tools: A Tutorial*, in proceedings of the 1st Pan Pacific Conference on Information Systems, June 1993, Kaohsiung, Taiwan, which is incorporated by reference herein.

Figure 11:
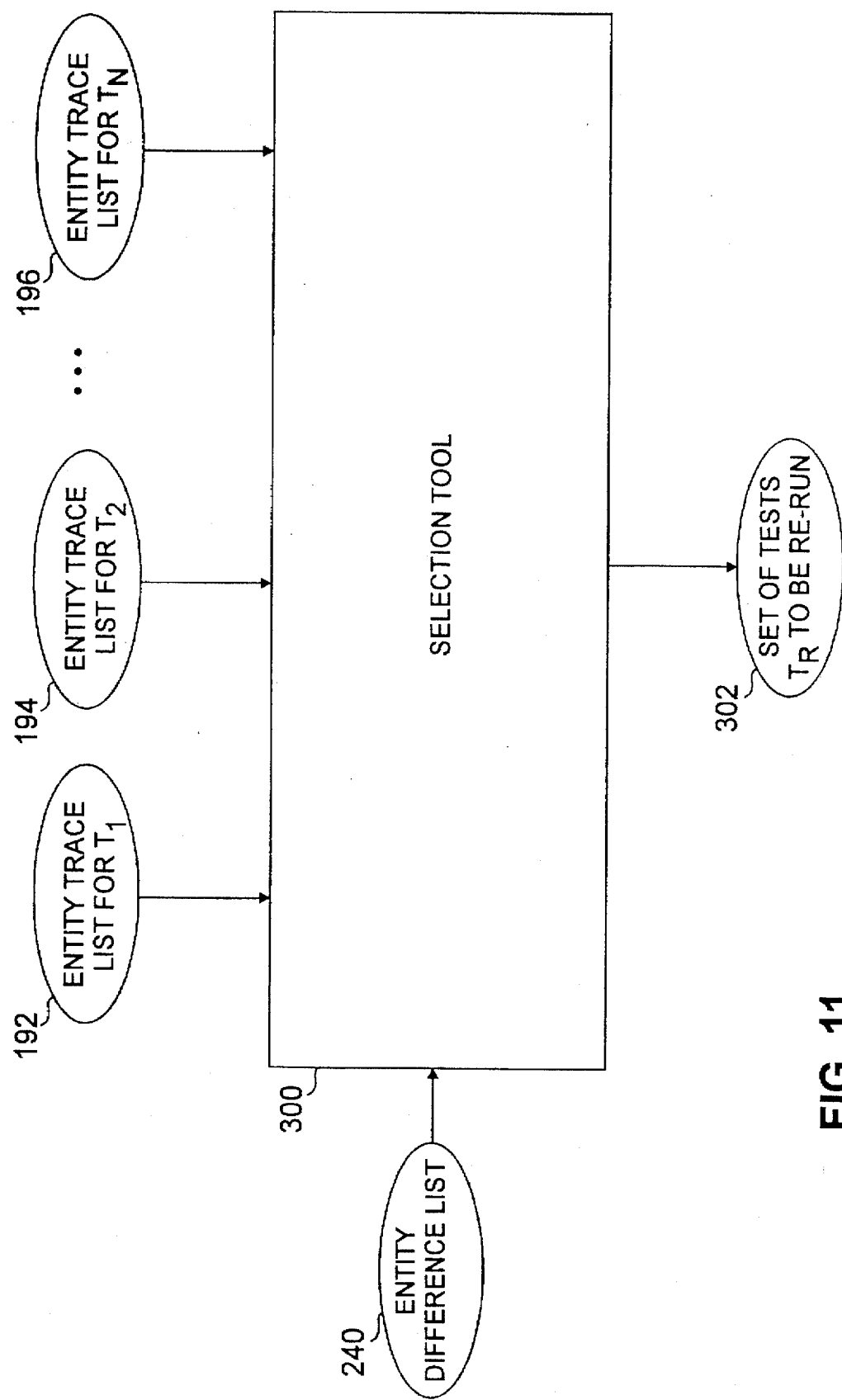
FIG. 11 is a block diagram of a selection tool which is used to generate the set of test units which are to be re-run in accordance with the present invention.

The entity difference list 240 is used by a selection tool to determine which test units of the test suite need to be re-run after the modification of the software system. FIG. 11 shows a block diagram of the functioning of the selection tool 300. The selection tool 300 receives as input the entity trace lists 192 and 194 through 196 which were generated by the transitive closure tool 190, as discussed above in conjunction with FIGS. 7 and 8. The selection tool 300 also receives as an input the entity difference list 240 which was generated by the difference tool 230, as discussed above in conjunction with FIGS. 9 and 10. The selection tool 300 compares the entities in the entity difference list 240, which represent the entities which have been changed by the modification of the software system, with the entities in each of the entity trace lists 192 and 194 through 196, which represent the entities covered by each of the test units $T_1$ 160 and $T_2$ 162 through $T_N$ 164. If an entity in one of the entity trace lists 192 and 194 through 196 matches an entity in the entity difference list 240, then the test unit corresponding to that entity trace list must be re-run.

Figure 12:
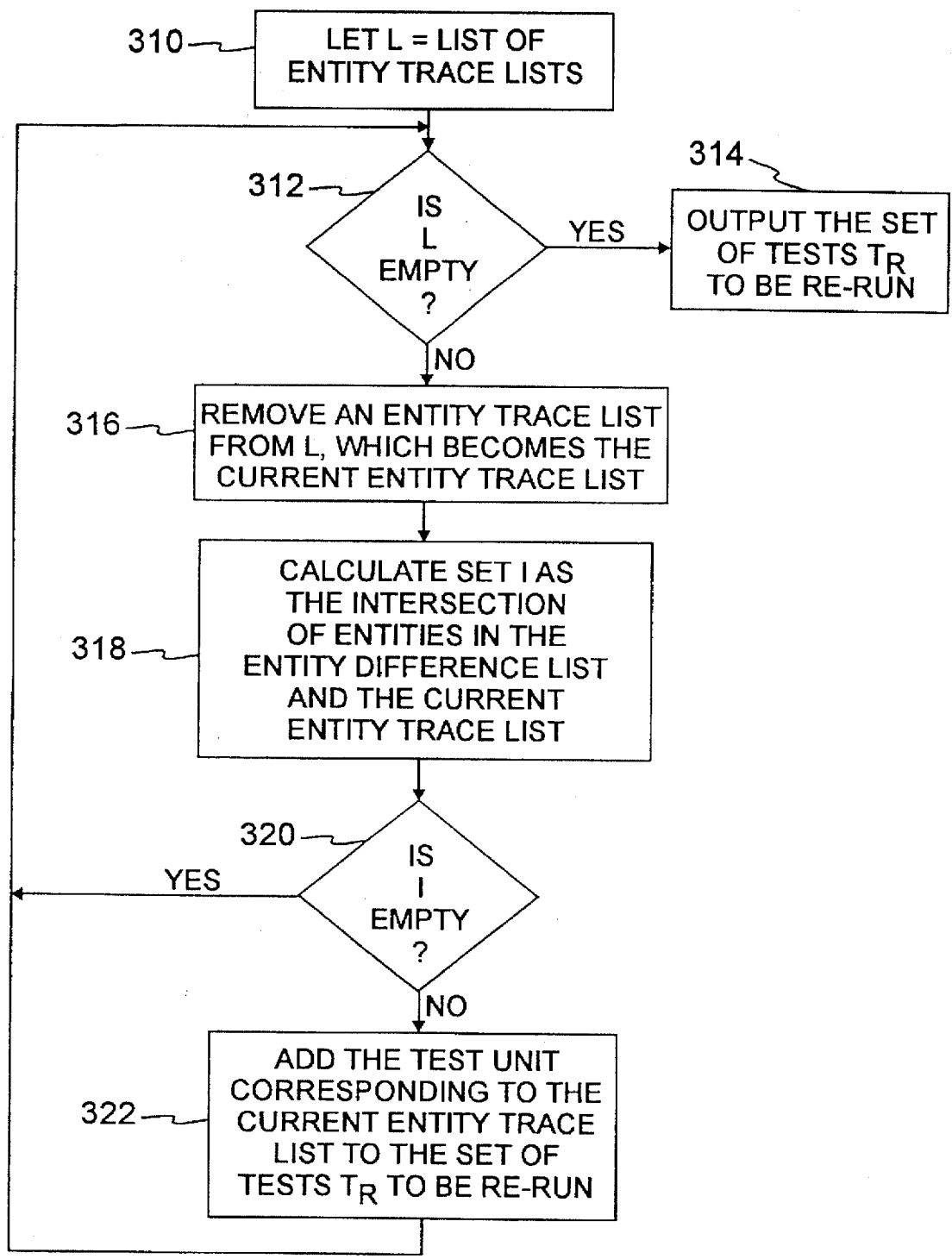
FIG. 12 is a flow diagram of the steps performed by the selection tool in generating the set of test units which are to be re-run in accordance with the present invention.

The functioning of the selection tool is further described with reference to the flow diagram of FIG. 12. In step 310 the list of entity trace lists 192 and 194 through 196 is assigned to list L. In step 312 it is determined whether the list L is empty. If L is not empty, then one of the entity trace lists is removed from the list L in step 316, and that entity trace list becomes the current entity trace list. In step 318 the set I is calculated. The set I consists of the intersection of entities in the entity difference list 240 and the current entity trace list. This set I may be calculated by any suitable method for comparing two lists to determine the intersections. A variety of suitable methods could be readily implemented by one of ordinary skill in the art. In step 320 it is determined whether the set I is empty. If the set I is empty, then control is passed to step 312. If the set I is not empty, then in step 322 the test unit which corresponds to the current entity trace list is added to the set of tests $T_R$ which are to be re-run. Control is then passed to step 312. If it is determined in step 312 that the list L is empty, then the set of tests to be re-run $T_R$ is output in step 314. This set $T_R$ contains the list of test units which must be re-run in order to test the software system after a modification.

Note that when the set $T_R$ of selected test units are re-run in order to test the modified software system, new entity trace lists must be generated for each test unit. This is a necessary preparation for the next modification and testing cycle, because some of the dependency relationships between the entities covered by each of the selected test units may have changed.

As an alternative embodiment, instead of the selection tool 300 using the entity difference list 240 as a specification of what entities have been changed between a first version and a second version of a software system, the selection tool could receive a user specified list of entities. Aside from this change, the selection tool 300 would function as described above. By allowing the selection tool to operate with a user specified list of changed entities as input, a user could use the selection tool 300 to determine which test units would need to be re-run if a hypothetical change were made to the software system.

Figure 13:
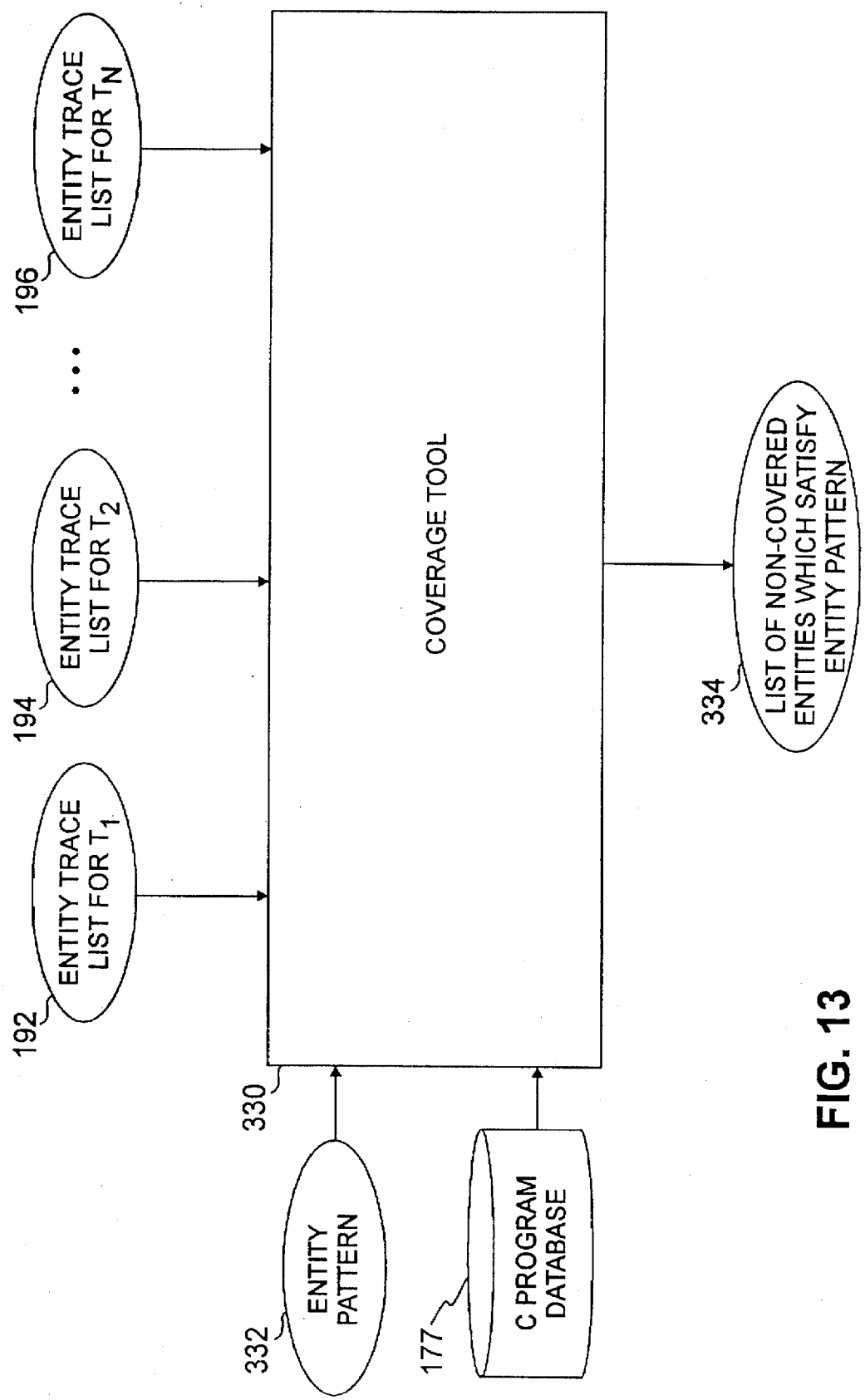
FIG. 13 is a block diagram of a coverage tool which is used to generate the list of non-covered entities in accordance with the present invention.

FIG. 13 shows the functioning of a coverage tool 330. The coverage tool 330 is used to identify which entities matching an entity pattern 332 are not covered by any test units in a test suite for a software system. As shown in FIG. 13, the coverage tool 330 receives the entity trace lists 192 and 194 through 196 which were generated by the transitive closure tool 190 as described in conjunction with FIGS. 7 and 8. The user supplies an entity pattern 332 which describes the kinds of entities which the coverage tool 330 will operate on. For example, if the user was only interested in determining which variables in the software system were not covered by any of the test units in the test suite, the user would specify the variable entity kind as the entity pattern. The coverage tool 330 uses the C program database 177 in conjunction with the entity trace lists 192 and 194 through 196 and the entity pattern 332 to generate the list 334 of non-covered entities which satisfy the entity pattern.

Figure 14:
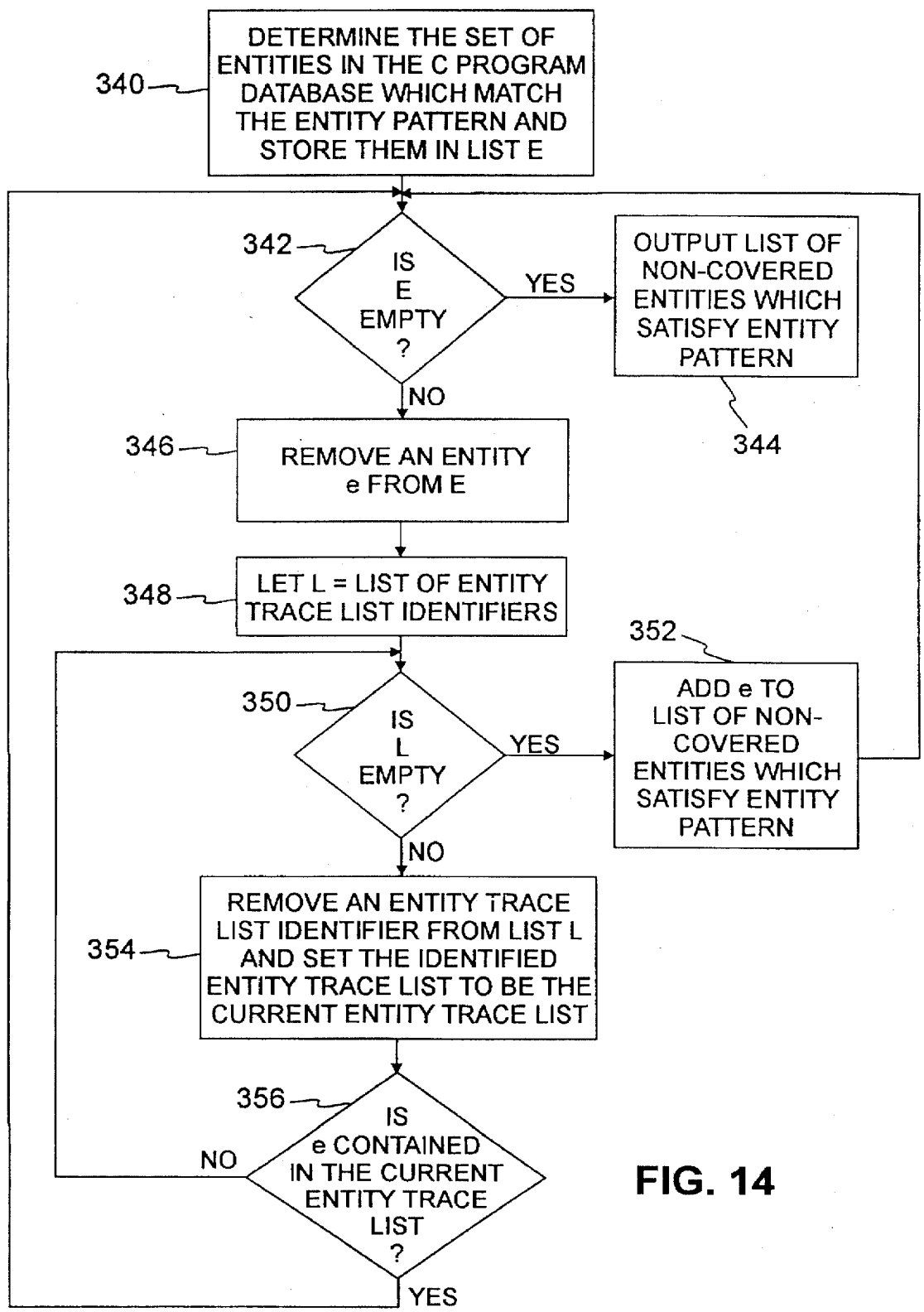
FIG. 14 is a flow diagram of the steps performed by the coverage tool in generating the list of non-covered entities in accordance with the present invention.

The functioning of the coverage tool 330 is described in more detail in conjunction with the flow diagram of FIG. 14. In step 340, the set of entities in the C program database 177 which match the entity pattern 332 are determined and stored in a list E. In step 342 it is determined whether the list E is empty. If E is not empty, then an entity e is removed from the list E in step 346. In step 348 the list of entity trace lists 192 and 194 through 196 is assigned to list L. In step 350 it is determined whether the list L is empty. If L is not empty, then in step 354 one of the entity trace lists is removed from the list L and the identified entity trace list becomes the current entity trace list. In step 356 it is determined whether entity e is contained in the current entity trace list. If yes, then control is passed to step 342. If no, then control is passed to step 350. If it is determined in step 350 that L is empty, then entity e is added to the list 334 of non-covered entities which satisfy the entity pattern 332 in step 352, and control is passed to step 342. If it is determined in step 342 that E is empty, then the list 334 of non-covered entities which satisfy the entity pattern 332 is output in step 344.

It is to be understood that the embodiments and variations shown and described herein are only illustrative of the principles of this invention and that various modifications may be implemented by those skilled in the art without departing from the scope and spirit of the invention. For example, the present invention has been described with reference to the C programming language. However, the invention is not limited to the C programming language, and it may be applied to other programming languages.

We claim:

1. A system for selective regression testing of a software system for determining which test units must be re-run as a result of a revision of the software system from a first software version to a second software version, the system comprising:
   means for generating a first program database comprising entities in the first software version and relationships between said entities in the first software version;
   means for generating a second program database comprising entities in the second software version and relationships between said entities in the second software version;
   means for comparing said first program database with said second program database to generate an entity difference list comprising entities which were changed by said revision of the software system;
   means for generating an entity trace list for each test unit, each entity trace list comprising the entities of the software system which have a dependent relationship with functions executed during execution of said test units;
   means for comparing said entity difference list with each of said entity trace lists; and
   means for determining which of said test units must be re-run as a result of said comparison of said entity difference list with each of said entity trace lists.

2. The system of claim 1 wherein said first and second program databases further comprise source text and wherein said means for comparing said first program database with said second program database further comprises means for comparing said source text.

3. The system of claim 1 wherein said first and second program databases further comprise a checksum attribute associated with each of said entities, and wherein said means for comparing said first program database with said second program database further comprises means for comparing said checksum attributes.

4. The system of claim 3 wherein each of said checksum attributes represents the source text of an associated entity.

5. The system of claim 1 wherein said means for generating an entity trace list further comprises:
   means for generating a function trace list for a test unit, said function trace list comprising functions executed during execution of the test unit; and
   means for determining which entities have a dependent relationship with said functions in said function trace list by reference to the entity relationships in said first program database.

6. The system of claim 5 wherein said software system comprises instrumented object code and wherein said means for generating a function trace list further comprises means for executing said instrumented object code.

7. The system of claim 1 wherein said entities comprise functions, variables, macros and types.

8. The system of claim 1 wherein said means for comparing said first program database with said second program database further comprises means for generating a new entity list comprising the entities which appear in said second software version but not in said first software version.

9. The system of claim 1 wherein said means for comparing said first program database with said second program database further comprises means for generating a removed entity list comprising the entities which appear in said first software version but not in said second software version.

10. The system of claim 1 wherein said means for comparing said first program database with said second program database further comprises means for generating an unchanged entity list comprising the entities which are unchanged by said software revision.

11. An apparatus for determining which entities of a software system are covered by a test unit of said software system, said apparatus comprising:
   a computer processor;
   means for executing said software system on said computer processor using said test unit;
   means for generating a program database which comprises entities in said software system;
   means for generating an entity trace list comprising functions which are executed during execution of the software system using said test unit and entities which have a dependent relationship with said executed functions; and
   means for comparing said entities in said entity trace list to said entities in said program database to determine which entities in said software system have a dependent relationship with functions executed during execution of said test unit as a result of comparing said entities in said entity trace list to said entities in said program database.

12. The apparatus of claim 11 wherein said means for comparing said entities in said entity trace list to said entities in said program database further comprises means for limiting said comparison to a specified entity kind.

13. The apparatus of claim 11 wherein said program database further comprises the relationship between the entities in the software system and wherein said means for generating an entity trace list further comprises:
   means for generating a function trace list comprising the functions which are executed during the execution of the software system using said test unit; and
   means for determining the entities which have a dependent relationship with said functions in said function trace list by reference to said entity relationships in said program database.

14. The apparatus of claim 13 wherein said software system comprises instrumented object code and wherein said means for generating a function trace list further comprises means for executing said instrumented object code.

15. The apparatus of claim 11 wherein said entities include functions, variables, macros and types.

16. A system for selective regression testing of a software system for determining which test units must be re-run when the software system is revised from a first software version to a second software version, the system comprising:
   a plurality of test units;
   a plurality of entity trace lists, each of said entity trace lists associated with one of said test units and comprising entities which have a dependent relationship with functions executed during execution of the associated test unit;
   a changed entity list comprising a list of entities; and
   means for comparing said changed entity list with said plurality of entity trace lists; and
   means for generating a list of test units which must be re-run in order to test the software system as a result of said comparison of said changed entity list with said plurality of entity trace lists; first software version to a second software version, the method comprising the steps of:
   generating a first program database comprising entities in the first software version and relationship between said entities in the first software version;
   generating a second program database comprising entitites in the second software version and relationship between said entities in the second software version;
   comparing said first program database with said second program database to generate an entity difference list comprising entities which were changed by said revision of the software system;
   generating an entity trace list for each test unit, each entity trace list comprising the entities of the software system which have a dependent relationship with functions executed during execution of said test units;
   comparing said entity difference list with each of said entity trace lists to determine which of said test units must be re-run.

17. The system of claim 16 wherein said changed entity list is a user specified list of entities.

18. The system of claim 16 further comprising:
   a first program database comprising the entities in the first software version;
   a second program database comprising the entities in the second software version; and
   means for comparing said first program database with said second program database to generate said changed entity list.

19. The system of claim 18 wherein said first and second program databases further comprise source text, and wherein said means for comparing said first program database with said second program database further comprises means for comparing said source text.

20. The system of claim 18 wherein said first and second program databases further comprise a checksum attribute for each of said entities, and wherein said means for comparing said first program database with said second program database further comprises means for comparing said checksum attributes.

21. The system of claim 20 wherein each of said checksum attributes represents the source text of the corresponding entity.

22. A method for selective regression testing of a software system for determining which test units must be re-run as a result of a revision of the software system from a first software version to a second software version, the method comprising the steps of:
   generating a first program database comprising entities in the first software version and relationship between said entities in the first software version;
   generating a second program database comprising entities in the second software version and relationship between said entities in the second software version;
   comparing said first program database with said second program database to generate an entity difference list comprising entities which were changed by said revision of the software system;
   generating an entity trace list for each test unit, each entity trace list comprising the entities of the software system which are covered by said each test unit; and
   comparing said entity difference list with each of said entity trace lists to determine which of said test units must be re-run.

23. The method of claim 22 wherein said first and second program databases further comprise source text, and wherein said step of comparing said first program database with said second program database further comprises the step of comparing said source text.

24. The method of claim 22 wherein said first and second program databases further comprise a checksum attribute for each of said entities, and wherein said step of comparing said first program database with said second program database further comprises the step of comparing said checksum attributes.

25. The method of claim 24 wherein each of said checksum attributes represents the source text of the corresponding entity.

26. The method of claim 22 wherein said step of generating an entity trace list further comprises the steps of:
   generating a function trace list for a test unit, said function trace list comprising the functions executed during execution of the test unit; and
   determining which entities have a dependent relationship with said functions in said function trace list by reference to said entity relationships in said first program database.

27. The method of claim 26 wherein said software system comprises instrumented object code and wherein said step of generating a function trace list further comprises the step of executing said instrumented object code.

28. The method of claim 22 wherein said entities comprise functions, variables, macros and types.

29. The method of claim 22 wherein said step of comparing said first program database with said second program database further comprises the step of generating a new entity list comprising the entities which appear in said second software version but not in said first software version.

30. The method of claim 22 wherein said step of comparing said first program database with said second program database further comprises the step of generating a removed entity list comprising the entities which appear in said first software version but not in said second software version.

31. The method of claim 22 wherein said step of comparing said first program database with said second program database further comprises the step of generating an unchanged entity list comprising the entities which are unchanged by said software revision.

32. A method for determining which entities of a software system are covered by a test unit of said software system, said method comprising the steps of:

executing said software system on a computer processor using said test unit;

generating a program database which comprises entities in said software system;

generating an entity trace list comprising functions which are executed during the execution of the software system using said test unit and entities which have a dependent relationship with said executed function; and comparing said entities in said entity trace list to said entities in said program database; and determining which entities in said software system have a dependent relationship with functions executed during execution of said test unit as a result of comparing said entities in said entity trace list to said entities in said program database.

33. The method of claim 32 wherein said step of comparing said entities in said entity trace list to said entities in said program database further comprises the step of limiting said comparison to a specified entity kind.

34. The method of claim 32 wherein said program database further comprises the relationship between the entities in the software system and wherein said step of generating an entity trace list further comprises the step of:

generating a function trace list comprising the functions which are executed during the execution of the software system using said test unit; and determining the entities which have a dependent relationship with said functions in said function trace list by reference to said entity relationships in said program database.

35. The method of claim 34 wherein said step of generating a function trace list further comprises the step of executing instrumented object code.

36. The method of claim 32 wherein said entities include functions, variables, macros and types.

37. A method for selective regression testing of a software system comprising the steps of:

executing said software system on a computer processor using a plurality of test units and for each of said test units generating a function trace list comprising functions executed during execution of the associated test unit;

generating a first program database of said software system comprising entities in the software system and relationships between said entities; and generating an entity trace list for each of said test units, each of said entity trace lists comprising functions in the function trace list for the associated test unit and entities dependent upon said functions.

38. The method of claim 37 further comprising the step of comparing said first program database to said entity trace lists to determine whether the entities in said program database have a dependent relationship with functions executed during execution of said test units.

39. The method of claim 38 further comprising the step of limiting said comparison of said first program database to said entity trace lists to a specific entity kind.

40. The method of claim 37 further comprising the steps of:

modifying said software system to create a revised software system;

generating a second program database of said revised software system comprising the entities in the revised software system and the relationship between said entities;

comparing said first program database with said second program database to generate an entity difference list comprising the entities which were changed by the software system modification; and comparing said entity difference list with said entity trace lists to determine which test units need to be re-run to test the revised software system.

41. The method of claim 40 wherein said first and second program databases further comprise source text and wherein said step of comparing said first program database with said second program database further comprises the step of comparing said source text.

42. The method of claim 40 wherein said first and second program databases further comprise a checksum attribute for each of said entities, and wherein said step of comparing said first program database with said second program database further comprises the step of comparing said checksum attributes.

43. The method of claim 37 further comprising the steps of:

receiving a user specified list of entities; and comparing said user specified list of entities with said entity trace lists to determine which test units would need to be re-run if the entities in the user specified list of entities were changed.

* * * * *